Feb. 10, 1942.  C. SPONSEL  2,272,252
BAIT SPREADER
Filed Oct. 5, 1939  2 Sheets-Sheet 1
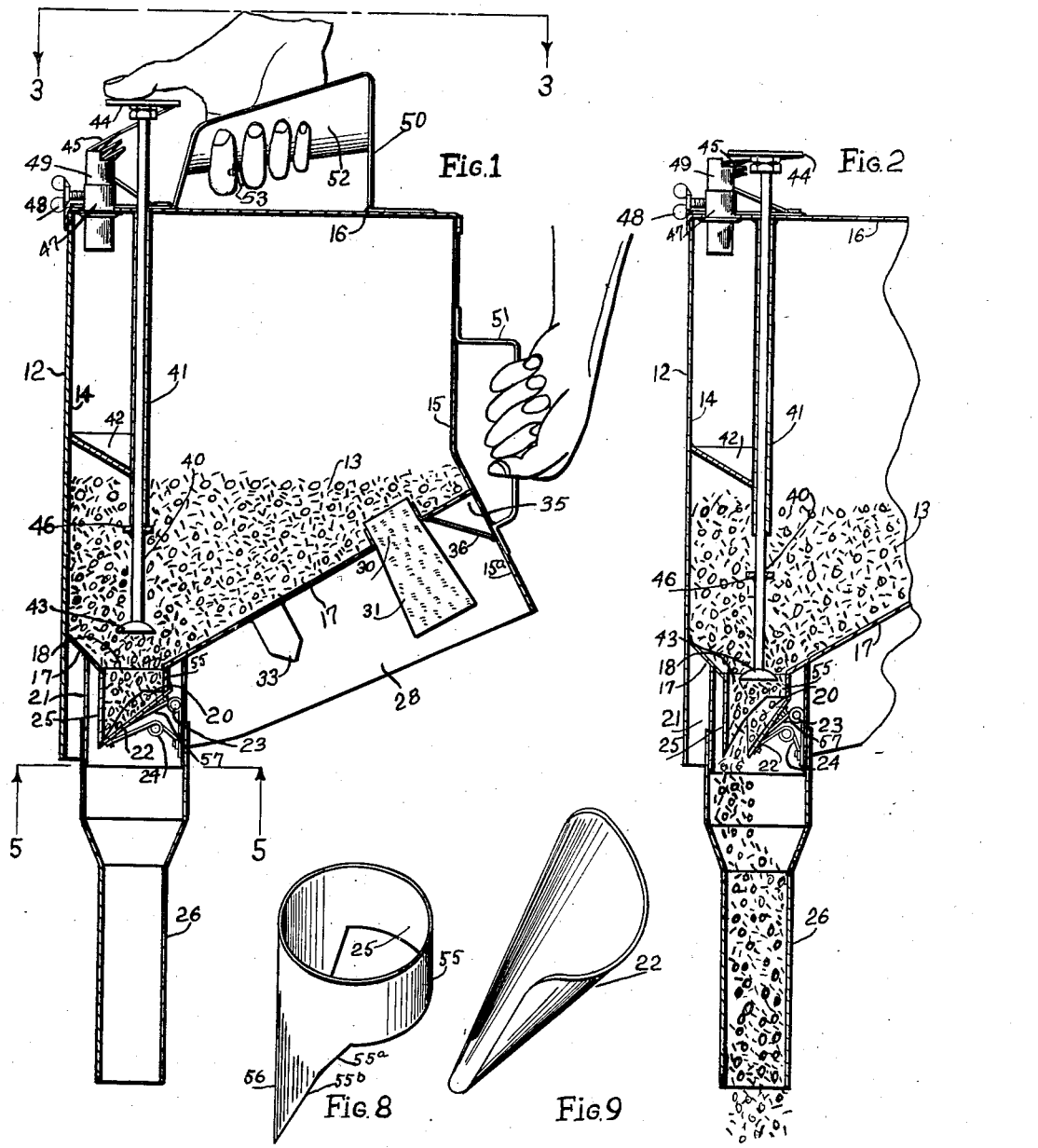
Inventor
Charles Sponsel
By Toulmin & Toulmin
Attorneys Feb. 10, 1942.     C. SPONSEL     2,272,252
BAIT SPREADER
Filed Oct. 5, 1939     2 Sheets-Sheet 2
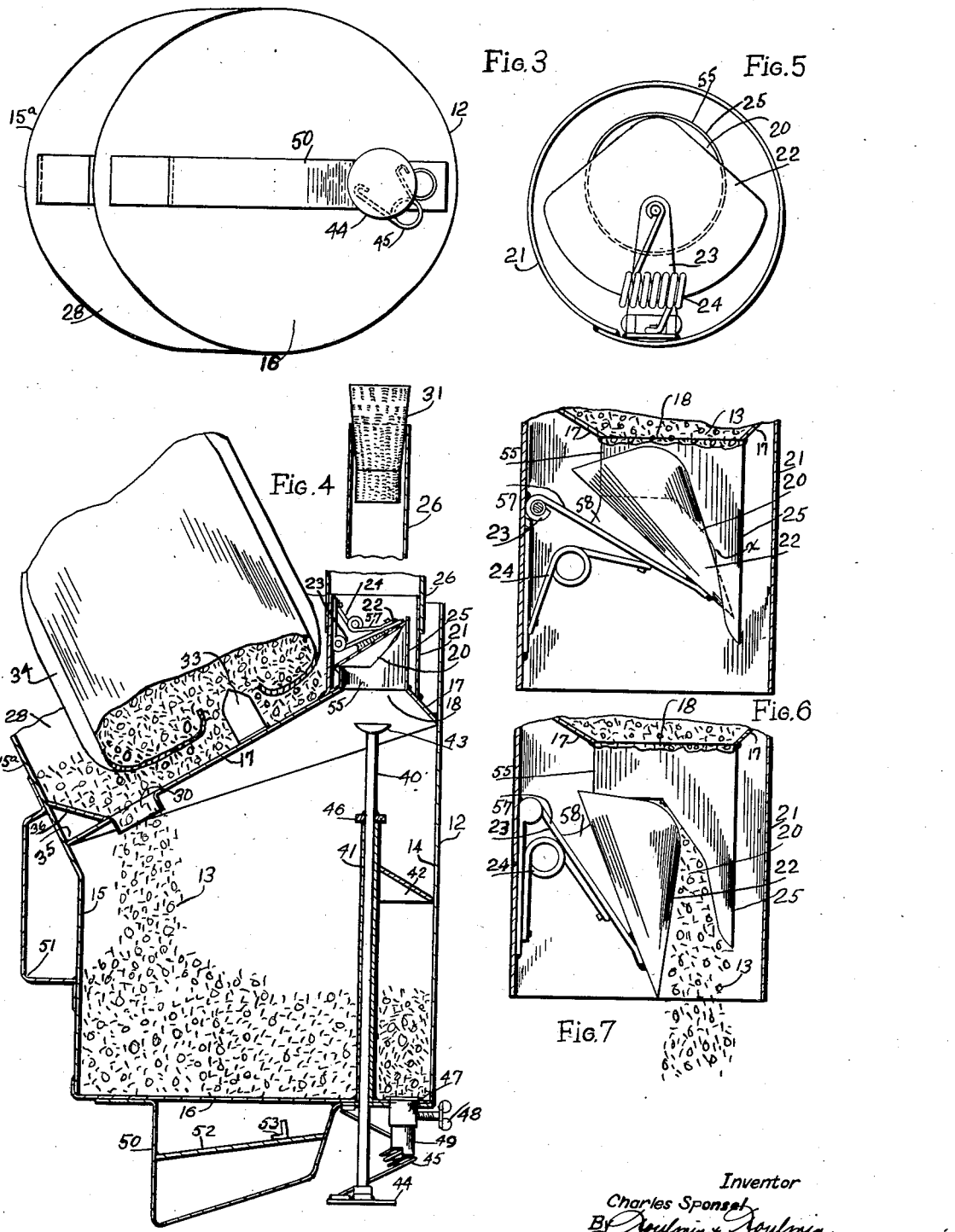
Inventor
Charles Sponsel
By Toulmin & Toulmin
Attorneys Patented Feb. 10, 1942

2,272,252

UNITED STATES PATENT OFFICE 2,272,252

BAIT SPREADER

Charles Sponsel, Albuquerque, N. Mex.

Application October 5, 1939, Serial No. 298,081

7 Claims. (Cl. 221—103)

My invention relates to dispensers and more particularly a device for dispensing or spreading bait for poisoning rodents and the like.

It is a primary object of my invention to provide a bait dispensing device comprising a container for storing bait to be dispensed having a valve controlled opening in communication therewith which is adapted upon actuation of the valve to permit the discharge of a predetermined amount of bait.

Another object is to provide a dispensing device which can be charged with poisoned grain or like material without touching the grain or portion of the dispenser which has come in contact with the poisoning material. To this end the bait containing the poison is preferably prepacked in bags made of paper, cloth or other frangible material, whereby the dispenser may be loaded through an opening in the bottom by breaking open one or more bags of poisoned bait and allowing the material to flow directly from the bag into the storage chamber of the dispenser.

Another object of this invention is to devise a mechanism for dispensing substantially uniform amounts of poisoned or unpoisoned bait into or adjacent the holes, burrows or restricted places made by rodents. In some instances, as in the case of prairie dogs, the bait is placed outside the holes, usually on the mounds.

Another object is to provide a device of the character described, comprising a novel valve mechanism for actuation to dispense bait which is so designed that leakage of bait past the valve in its closed position is substantially avoided.

Another object is to provide a bait spreader or dispenser of the type mentioned which is designed so as to be readily and quickly adjustable by the fingers of the operator, without the use of tools. Means is provided for quickly adjusting the stroke of the plunger actuating the bait dispensing valve mechanism. In this way the quantity of bait discharged during each reciprocation of the plunger can be varied at the will of the operator.

Another object is to provide an improved valve for controlling the passage of grain and the like granular material from a container or storage compartment so that leakage of the material past the valve is substantially eliminated.

Another object is to provide an improved spring pressed valve for controlling the passage of granular material which is easily removed and replaced and which will operate efficiently.

Another object is to devise a valve of loose jointed hinged construction which effectively shuts off the passage of grain or the like granular material by squeezing the particles together against curved edges along the contacting side wall portions of the valve members.

Another object is to devise a poison dispensing means which can be carried along and operated while on foot, horseback or when riding along in a vehicle. For this purpose a detachable spout member is provided of suitable length for positioning over the discharge opening in the dispensing device so that scattering of the poison is prevented when the device is held above the ground as when dispensing the poisoned bait while on horseback or from a vehicle.

Still another object of this invention is to provide an appliance of this character which will be formed of a relatively small number of parts, is durable and which will not easily get out of order.

In the accompanying drawings forming a part of this specification:

Figure 1 is a vertical sectional view illustrating the construction and operation of my bait dispensing device;

Figure 2 is a similar sectional view, partly broken away, showing the valve through which bait is dispensed in open position;

Figure 3 is a top plan view of the device taken on the line 3—3 of Figure 1 looking in the direction of the arrows;

Figure 4 is a vertical sectional view through the inverted device illustrating the method of loading the dispenser with bait;

Figure 5 is a bottom view of the valve and spout of the device taken on the line 5—5 of Figure 1 looking in the direction of the arrows and showing the valve in closed position;

Figure 6 is a fragmentary detail sectional view taken through the valve and spout part of the device showing the relative position of the parts when the valve is closed;

Figure 7 is a similar sectional view through the valve and spout showing the valve in open position;

Figures 8 and 9 are perspective views of the valve gate members.

Referring to the drawings in detail, in which like character references designate similar parts in the various views, the device comprises a casing generally designated 12 shaped to provide a container of suitable size. Preferably the casing is formed of sheet metal but if desired it may be made of wood, stiff cardboard, synthetic plastic fabricated material, glass or the like.

In the container the bait 13 is stored and dispensed as required. Preferably the bait comprises granular flowable material consisting of a mixture of cereal grains, for example, corn, oats, wheat or the like, in which pea or bean seeds may be incorporated; the whole forming a pourable mixture. Poison in the form of powder or fluid may be mixed with the grains so that they will carry enough poison to produce deadly results when eaten by rodents. A typical example of a poisonous mixture which may be used is as follows: nine parts of oats to one part by weight of peas, to which mixture is added thallous sulfate ($Tl_2SO_4$) in sufficient amount to produce a poisonous mixture. In place of thallous sulfate other poisonous insecticides may be used such as arsenic and suitable compounds thereof. Further, it will be understood that other cereals may be substituted for oats and various mixtures of these materials may be utilized in place of the above mentioned mixture.

As shown in Figures 1 and 2, the container 12 comprises the side wall members 14 and 15 which are closed at the upper end by the wall member 16. The bottom of the container comprises a funnel shaped wall 17. At the lowermost portion of the bottom wall 17 is a tubular opening 18 through which the bait material is discharged. For controlling the dispensing of the bait a valve generally designated 20 is positioned adjacent the discharge opening 18. An enlarged tubular extension 21 is attached to the underside of the bottom wall 17 adjacent the opening 18 and forms a support for the pivoted valve member 22 which is secured to a hinge member 23 suitably fastened to the inside wall part of the tubular member 21. A demountable coil spring 24 is attached to the valve member 22 and urges it in a closed position against the opposed fixed valve part 25.

A cylindrical spout extension 26 is arranged to telescopingly fit over the outer end of the tubular member 21. This spout is suitably shaped so as to guide the bait grains into or adjacent the holes, or restricted places, where the bait is to be placed preventing undue scattering of the bait. The walls 14 and 15 are extended below the conical bottom wall 17 forming a depending skirt generally designated 28 therearound, as shown in Figures 1 and 4. The side wall skirt portion 15a extends outward at an angle to the wall 15. Suitably spaced from the wall 15a is an opening 30 in the bottom wall 17 by means of which the bait is loaded into the container while it is inverted, as shown in Figure 4. A cork stopper of other suitable means is provided for closing the opening 30 after loading the device with bait.

*Procedure for loading the dispenser*

In loading the dispenser with bait the device is turned upside down and the stopper 31 removed and placed in the outer end of the spout 26, which preferably is of substantially the same diameter as the inlet opening 30. This prevents the discharging of poisonous dust or waste material upward into the face of the operator while charging the container 12 with bait. An upstanding knife-like member 33 is fixedly mounted on the bottom wall 17 of the device which provides a suitable means for breaking open the bag 34 containing poisonous bait in order to discharge its contents into the container 12, as illustrated in Figure 4. As shown, the bait is suitably supplied in bags which are broken open by forcing the same against the knife means 33. To prevent the bait from lodging in the lower corner 35 of the device there is provided a guide member 36 which comprises a half-moon shaped section diagonally positioned across the lower corner and soldered or otherwise attached at its periphery to the wall members 15a and 17. Member 36 is adapted to guide the bait into the opening 30 when filling the dispenser as shown in Figure 4.

*Dispensing mechanism*

For dispensing a measured amount of bait from the container 12 there is provided a plunger 40 which is arranged to reciprocate in the guideway 41. The latter is separately positioned over the discharge opening 18 and is fixed at the upper end to the top 16 of the device and rigidly fastened near its lower end to the side wall 14 by means of the support 42. On the lower end of the plunger 40 is an inverted cup shaped member 43 which is preferably made about ½ to ¾ inch smaller than the diameter of the outlet opening 18. The opposite end of the plunger 40 extends through the top wall 16 and fixed on the end is a disc 44 which is adapted to act as a thumb rest when operating the plunger, as illustrated in Figures 1 and 2. Downward movement of the plunger 40 forces out a more or less uniform amount of grain or bait. Opening of the valve is effected by the pressure of the plunger and member 43 which engages the bait interposed between the member 43 and the spring retained valve member 22. Normally the plunger 40 is retained in its uppermost position by the spring 45 so that the stop means 46 on the plunger is in engagement with the lower end of the guide 41. The end member 43 on the plunger is retracted far enough above the rim of the discharge opening 18 so as to allow bait to flow therearound and fill the space between the end of the plunger and the valve 20. The length of the stroke is gauged by adjusting the height of the stop pin member 49 which is reciprocable in the collar 47. A wing nut set screw 48 is provided for locking the stop pin 49 in the desired position. Handles 50 and 51 are provided for holding the device in position to be manipulated.

These handles are suitably mounted on the top and side wall portions of the device respectively, as illustrated in Figure 1. The weight of the bait dispensing device is evenly distributed with respect to the handle 50 so that the operator can readily reciprocate the plunger using the thumb as a moving lever. For providing a more comfortable grasping means the underside of the handle 50 is equipped with a curved filler portion 52 and finger rest 53.

*Valve construction*

An important feature of this invention is the shape and arrangement of the valve 20. This valve is of loose jointed construction and comprises the coacting bird-bill shaped members 22 and 25. These members are moved into engagement and stop the passage of grain or bait by squeezing the particles together in the bottom curved portions of the valve members.

The valve member 25 is stationary and comprises an upper cylindrical portion 55 which fits the opening 18. Integral with the cylindrical portion 55 is a depending parabolic shaped portion 56 having the peripheral edge constructed so as to provide an inward curved section 55a and an outward curved continuing edge portion 55b, as illustrated in Figure 8.

The associated coacting valve part 22, as illustrated in Figure 9, comprises a spoon shaped member which is of wider radius of curvature than member 25 and is adapted to be moved in underlapping engagement with the outer end portion 55b of the valve part 25, as illustrated in Figure 6. The valve half 22 is fastened to the leaf 57 of the hinge means 23 by means of a suitably shaped flange member 58 so that the valve member 22 will be positioned to swing into engagement with member 25 to stop the flow of bait. The opposed edges of the valve parts x do not directly contact each other, and a small space is left between the lowermost portion of the valve member 25 and the lip of the valve half 22. This opening, however, is not large enough to allow the passage of the grains comprising the bait mixture. Due to the overlapping and loose jointed construction of the valve, particles of bait do not get caught between the parts during closing of the valve. When closing, particles of bait are pushed upward against the inner curved wall of the valve part 25 so that the valve members can be brought close enough together to completely stop the flow of bait particles.

It will be understood that my improved valve is adapted for use in similar devices for controlling the dispensing of granular material such as grain, sugar, salt and the like, where uniformly measured amounts of material are to be dealt out.

From the above description it is thought that the construction and operation of my invention will be readily understood by those skilled in the art without further explanation.

It will be also understood that this invention is not limited to the particular details of construction and may be varied to meet the requirments of different conditions and uses.

Having thus fully described my invention, what I claim as new and desire to secure by Letters Patent is:

1. A dispensing device for dealing out uniform material, said device comprising a chamber for retaining material to be dispensed, said chamber having a sloping bottom wall, a discharge outlet in said bottom wall, an inlet opening in said sloping wall spaced from said outlet, closure means for said inlet opening, a valve in said discharge outlet, a spout section attached to said bottom wall and enclosing said valve, said sloping bottom wall forming a common wall for retaining said material to be dispensed and for supporting material to be charged into said chamber to refill said device, means associated with said valve for forcing the valve open to discharge material from said chamber, and means associated therewith for controlling the amount of material dispensed through said discharge outlet during operation of said device.

2. A dispensing device for dealing out controlled amounts of granular material therefrom at intervals, said device comprising a casing forming a chamber for retaining material to be dispensed, said casing having an inclined bottom wall, controlled discharge and inlet openings in said inclined wall forming a common wall for retaining material to be dispensed and receiving material to be charged into said chamber, a flap valve for controlling the passage of material through said discharge opening, said valve comprising a fixed cylindrical portion having an integral depending lip portion, a spoon shaped valve member associated therewith and movable in underlapping engagement with said fixed valve lip member to normally maintain said discharge opening closed, a reciprocable plunger means adapted to contact said material being dispensed in said chamber above said flap valve and move the same against said valve to actuate the opening thereof to discharge said material, and means comprising a spout associated with said discharge opening for directing the flow of said material from said discharge opening.

3. A dispensing device for dealing out substantially uniform amounts of material at intervals, said device comprising a casing forming a container for retaining material to be dispensed, said container having inlet and outlet openings, a valve in said discharge opening, said valve comprising two juxtapositioned curved spoon shaped members, one of said members being movable relative to the other in underlapping engagement therewith, means comprising a reciprocable member engageable with said movable valve member and coacting with said material in the container to force open said valve and discharge a portion of the material from said container, and means associated with said movable valve member for actuating the closure of said valve after said portiton of material has been dispensed, said valve parts coacting to squeeze the particles of material together along the contacting side wall portions thereof to effectively arrest the flow of material through the valve.

4. In a device for dispensing a dry granular mixture in controlled amounts, a container for storing portions of said mixture to be dispensed, said container comprising a sloping bottom wall having spaced inlet and outlet openings therein, means reciprocable in said container adjacent said outlet opening for punching out a portion of said granular mixture disposed in said container, means comprising a flap valve movable in lapping engagement with a stationary member for normally maintaining said outlet opening closed, said reciprocable means coacting with said granular mixture being dispensed to open said flap valve, and means for adjusting the amount of material dispensed upon actuation of said reciprocable member.

5. As an article of manufacture, an improved valve having a fixed tubular member comprising a depending curved lip portion, and a coacting movable valve member arranged in telescoping engagement with said tubular member, said movable valve member comprising a curved depending lip portion having a radius of curvature smaller than that of said depending curved lip portion on said fixed tubular member and adapted to move in overlapping position with respect to said depending lip portion on said fixed tubular valve member.

6. As an article of manufacture, an improved valve for controlling the passage of flowable substantially dry particles, said valve comprising two coacting spoon shaped valve members, said valve members being arranged in lapping engagement, one of said valve members being of wider radius of curvature and adapted to telescope over said other member, said valve members comprising depending curved lip portions arranged to be brought together in lapping engagement whereby said valve members coact together to squeeze the particles of material flowing through the valve during the closing movement of said valve to effectively clog the passageway between the valve members and stop the flow of material through the valve.

7. A dispensing device for dealing out substantially uniform amounts of poisonous grain material at intervals, said device comprising a casing forming a chamber for retaining material to be dispensed, said casing having a sloping bottom wall, a discharge outlet in said bottom wall communicating with said casing, a valve in said discharge outlet, a spout of larger diameter than said discharge outlet arranged around said outlet opening and said valve means, plunger means reciprocable in said casing and adapted to contact said poisonous grain material contained therein and move the same against said valve to actuate the opening thereof to discharge said material, and means associated with said plunger for varying the stroke thereof to control the amount of material dispensed through said discharge outlet during reciprocation of said plunger.

CHARLES SPONSEL.